(12) United States Patent
Cernasov (10) Patent No.: US 7,586,681 B2
(45) Date of Patent: Sep. 8, 2009

(54) DIRECTIONAL DISPLAY (75) Inventor: Andrei Cernasov, Ringwood, NJ (US)

(73) Assignee: Honeywell International Inc., Morristown, NJ (US)

( * ) Notice: Subject to any disclaimer, the term of this patent is extended or adjusted under 35 U.S.C. 154(b) by 169 days.

(21) Appl. No.: 11/605,273

(22) Filed: Nov. 29, 2006

(65) Prior Publication Data
US 2008/0123182 A1    May 29, 2008

(51) Int. Cl.
G02B 27/22    (2006.01)
(52) U.S. Cl. .......................... 359/464; 348/55
(58) Field of Classification Search .............. None
See application file for complete search history.

(56) References Cited

U.S. PATENT DOCUMENTS

| 6,369,954 | B1 | 4/2002 | Berge et al. |
| 6,538,823 | B2 | 3/2003 | Kroupenkine et al. |
| 6,545,815 | B2 | 4/2003 | Kroupenkine et al. |
| 6,545,816 | B1 | 4/2003 | Kroupenkine et al. |
| 6,603,444 | B1 | 8/2003 | Kawanami et al. |
| 6,674,940 | B2 | 1/2004 | Kroupenkine |
| 6,778,328 | B1 | 8/2004 | Aizenberg et al. |
| 7,061,678 | B1 * | 6/2006 | Chikazawa ................. 359/464 |
| 2004/0223218 | A1 * | 11/2004 | Putilin et al. ................ 359/462 |
| 2004/0239757 | A1 * | 12/2004 | Alden ......................... 348/51 |
| 2005/0113912 | A1 | 5/2005 | Feenstra et al. |

FOREIGN PATENT DOCUMENTS

WO    WO 2004075526 A2 *    9/2004

OTHER PUBLICATIONS

Why is the Texas Instruments Digital Micromirror Device™ (DMD™)so reliable?; CVPINFO/DOUGLAS/PAPER/myths8.doc.
Autostereoscopic displays and computer graphics, Halle, Michael, Computer Graphics, ACM SIGGRAPH, 31(2), May 1997, pp. 58-62.

* cited by examiner

Primary Examiner—Lee Fineman
(74) Attorney, Agent, or Firm—Ingrassia Fisher & Lorenz, P.C.

(57) ABSTRACT

Displays and methods are used to direct light. A display panel (150) includes an array of light deflectors (220) having multiple operable states for deflecting light to different observing positions. A control unit (145) controls the light deflectors to switch between the different operable states. The display panel displays different images when the light deflectors are in the different operable states. The timing of the light deflectors may be designed such that the different images are displayed substantially simultaneously.

14 Claims, 10 Drawing Sheets

FIRST OPERABLE STATE

BACKLIGHT SOURCE

FIG. 6B

SECOND OPERABLE STATE

BACKLIGHT SOURCE

DIRECTIONAL DISPLAY

BACKGROUND OF THE INVENTION

1. Field of the Invention

The present invention relates to image display devices and, more particularly, to display panels having directional control over images being displayed.

2. Description of the Related Art

A three-dimensional (3D) visual effect is created for a viewer when the viewer's left eye sees something different than the right eye. Specifically, when a person looks at an object, the left eye forms a left-eye image $I_L$ of the object, while the right eye forms another, slightly different, right-eye image $I_R$ of the object. The differences between a left-eye image $I_L$ and a right-eye image $I_R$ can be seen by looking at an object with the left eye while the right eye is covered, and then with the right eye while the left eye is covered. Both images $I_L$ and $I_R$ are sent to the brain, which processes them in order to obtain a 3D image of the object.

Existing techniques for simulating this 3D effect have required the viewer to wear special visors, glasses, or other viewing aids. However, autostereoscopic displays have been developed to present 3D images to viewers without requiring the viewer to wear glasses or other viewing aids. Specifically, autostereoscopic displays attempt to create the 3D effect by displaying two slightly different images in slightly different directions. By displaying these different images directly to the left and right eyeballs of the viewer, the 3D effect can be established.

Various types of autostereoscopic displays are described in "Autostereoscopic Displays and Computer Graphics", by Michael Halle, *Computer Graphics*, ACM SIGGRAPH, 31(2), May 1997, pp. 58-62, the entire contents of which are herein incorporated by reference. As described in this reference, existing autostereoscopic displays use optical elements such as lenses, varifocal mirrors, and lenslet arrays, to generate 3D images.

For example, one type of system relies on a lenticular sheet array to divide the viewing field into "slices" in which the 3D images can be seen. If the viewer correctly situates him/herself within a slice, different images are displayed directly toward the viewer's left and right eyes, respectively. However, the 3D effect is reduced if the viewer is not sitting within one of these slices. The positioning of these slices is dependent on the refractive qualities/dimensions of the lenslet sheet array and, thus, is not controllable by the display device.

Also, manufacturing the optical elements used in typical autostereoscopic displays poses serious problems. It is very difficult to make such optical elements (e.g., lenslet sheet arrays) with high quality and, yet, keep them affordable. This tends to limit the resolution and quality of the 3D images produced by autostereoscopic displays. For example, it is particularly hard to reduce the dimensions of lenslets in a lenticular sheet arrays, thus limiting the resolution of the 3D images produced.

SUMMARY OF THE INVENTION

Disclosed embodiments of this application utilize controllable light deflectors to aim images in precise directions. In an exemplary embodiment, an array of micro-sized light deflectors is implemented in the display panel so that each light deflector corresponds to a particular pixel position. A controller programs the light deflectors so that the display panel aims different images in different directions, i.e., toward different observing positions. These different images may be transmitted to the respective observing positions in a simultaneous, or substantially simultaneous, manner.

For example, the observing positions may correspond to the left and right eyeballs of a viewer, and slightly different images may be directed to each eyeball in order to create a 3D visual effect may be created for the viewer.

The controller may further be designed to identify the observing positions in the display panel environment, and program the light deflectors accordingly. Thus, contrary to existing autostereoscopic systems, the directions in which the different images are transmitted are determined according to the controller, rather than the design of a lenslet array or other optical element.

BRIEF DESCRIPTION OF THE DRAWINGS

Further aspects and advantages of the present invention will become apparent upon reading the following detailed description in conjunction with the accompanying drawings, which are given by way of illustration only and, thus, are not limitative of the present invention. In these drawings, similar elements are referred to using similar reference numbers, wherein.

DETAILED DESCRIPTION

Figure 1:
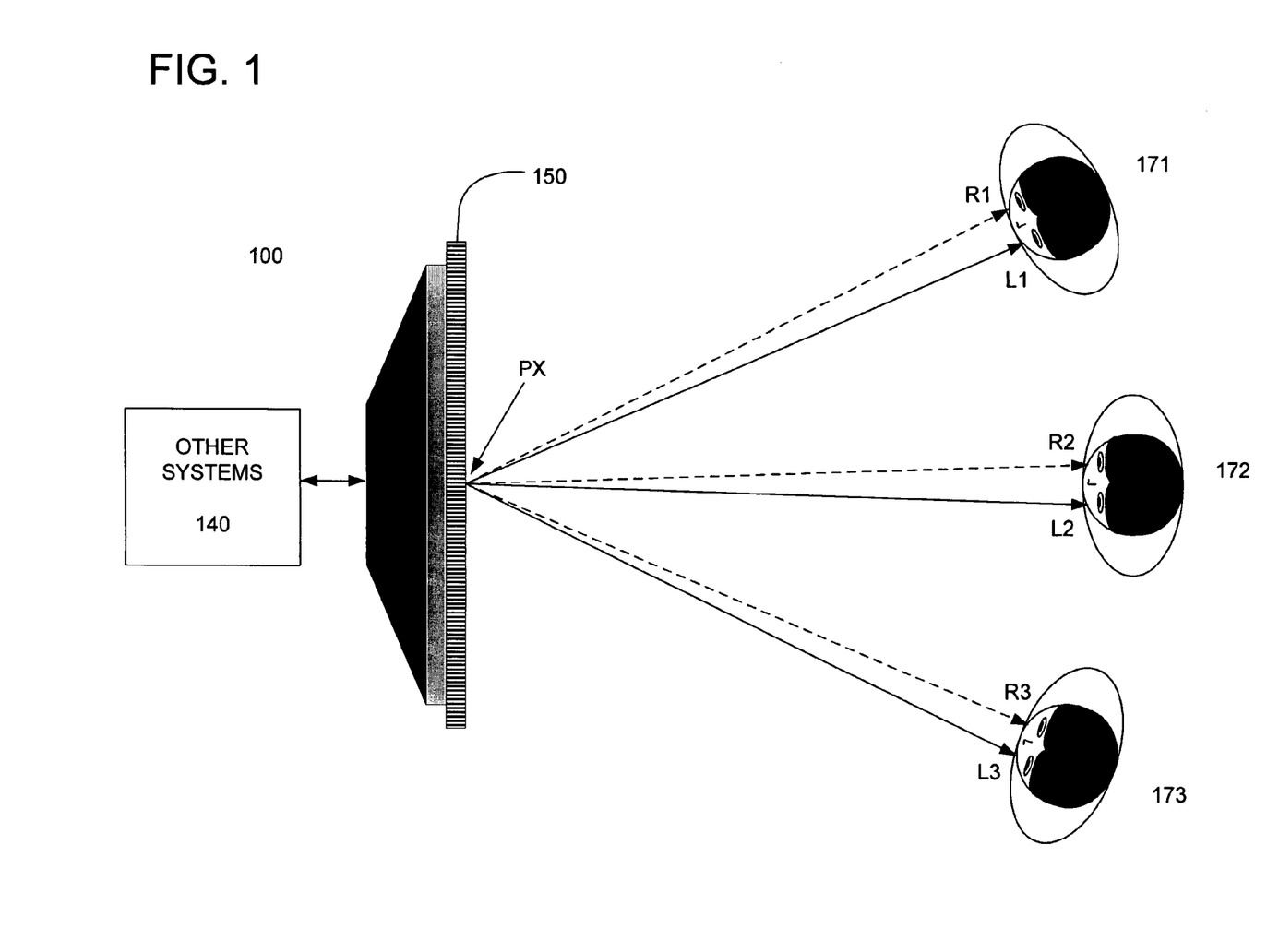
FIG. 1 illustrates an image display device for directional display, according to an embodiment of the present invention.

Aspects of the invention are more specifically set forth in the accompanying description with reference to the appended figures. FIG. 1 illustrates an image display device including for directional display, according to an embodiment of the present invention. As shown in FIG. 1, the image display device 100 includes a display panel 150, and other systems 140. Other systems 140 include electrical systems, mechanical systems, electronic systems, etc., that ensure operation of image display device 100. For instance, the image display device 100 includes a controller that controls operation of elements in the display panel 150, as will be described in more detail below in connection with FIG. 2.

The display panel 150 is capable of generating images and aiming them in different programmable directions, i.e., to different observing positions in the environment. According to an embodiment of the present invention, the display panel 150 is designed to generate different images and transmit them in different directions, simultaneously (or substantially simultaneously).

FIG. 1 illustrates a particular example where there are persons (at positions 171, 172, and 173, respectively) who are viewing the display panel 150. The viewer at position 171 has left and right eyeballs at positions L1 and R1, respectively. The viewer at position 172 has left and right eyeballs at positions L2 and R2, respectively, while the viewer at position 173 has left and right eyeballs at positions L3 and R3, respectively. Of course, the device 100 may be designed to accommodate more than three, or less than three, different viewers.

As shown in FIG. 1, the display panel 150 is capable of aiming light from each pixel position PX directly to positions L1, R1, L2, R2, L3, and R3. For instance, in order to display a 3D image to each of the viewers at positions 171, 172, and 173, the display device 100 may generate slightly different images $I_L$ and $I_R$ to be viewed by the left and right eyes, respectively, of each viewer. In other words, the device 100 may generate different sets of pixilated image signals corresponding to images $I_L$ and $I_R$, respectively. Thus, in display panel 150, each pixel position PX may transmit light to positions L1, L2, and L3 in accordance with an image signal corresponding to image $I_L$. Likewise, each pixel position PX in the display panel may transmit light to positions R1, R2, and R3 in accordance with an image signal corresponding to image $I_R$. Accordingly, each viewer would see the image $I_L$ in the left eye and $I_R$ in the right eye, thereby allowing a 3D visual effect to be created for each viewer.

In a further exemplary embodiment, the image display device 100 has information regarding the specific positions L1, R1, L2, R2, L3, and R3 of the viewers' eyeballs, thereby allowing the display panel 150 to be programmed to aim images to these positions. This may be accomplished in several ways.

For instance, in one embodiment, the display panel 150 may be pre-programmed with the eyeball positions L1, R1, L2, R2, etc. In such an embodiment, viewers may be required to situate themselves at assigned positions 171, 172, and 173, such that their respective eyeballs will be positioned at the pre-programmed L1, R1, L2, R2, L3, and R3.

Alternatively, a viewer may be responsible for programming the display panel to properly aim the right and left eyeball images $I_R$ and $I_L$, based on the viewer's current position. For instance, the viewer may use a remote controller to incrementally adjust the direction at which IR and IL are aimed, until the 3D visual effect is achieved.

However, according to another embodiment, algorithms may be employed in the image display device 150 to determine the current positions L1, R1, L2, R2, L3, and R3 of the eyeballs of the respective viewers, as will be in more detail below in connection with FIG. 6.

While the above embodiment displays the same image $I_L$ to the viewers' left eyes and the same image $I_R$ to the viewers' right eyes, other embodiments are possible. For instance, the principles of the present invention may be used for displaying different images to different viewers. Referring again to FIG. 1, for example, the image display device 100 may be designed to display one image $I_1$ to the viewer at position 171, a second image $I_2$ to the viewer at position 172, and a third image $I_3$ to the viewer at position 173. To do this, each pixel position PX may be designed to deflect light toward L1 and R1 in accordance with image signals corresponding to $I_1$, deflect light toward L2 and R2 in accordance with image signals corresponding to image $I_2$, and deflect light toward L3 and R3 in accordance with image signals corresponding to image $I_3$. Furthermore, it will be readily apparent to those of ordinary skill in the art that images $I_1$-$I_3$ may either be displayed as standard 2D images, or as 3D images, consistent with the principles of the present invention.

The display panel 150 may use precision light deflecting devices, which are capable of being in different operable states for deflecting light in different directions (i.e., toward different directions). Each light deflector may be switched into a particular operable state by a corresponding steering unit. The set of steering units may be driven by electrical control signals of one or more controllers.

For instance, a precision light deflecting devices may be implemented using a mechanical, microscopically small mirror. E.g., the light deflecting devices may be manufactured according to Digital Micromirror Device™ (DMD) technology developed by Texas Instruments. Other types of precision light sensing device may utilize microfluidic devices, e.g., as described in U.S. patent application Ser. Nos. 11/546,441 and 11/546,442, entitled "Microfluidic Prism" and "Microfluidic Imaging Array," respectively, both filed Oct. 12, 2006, the entire contents of both of which are herein incorporated by reference. Further details regarding the use of microfluidic devices are provided below with respect to FIGS. 5A-7, while further details regarding the use of mechanical micro-mirrors are provided below in connection with FIGS. 8A and 8B.

Figure 2:
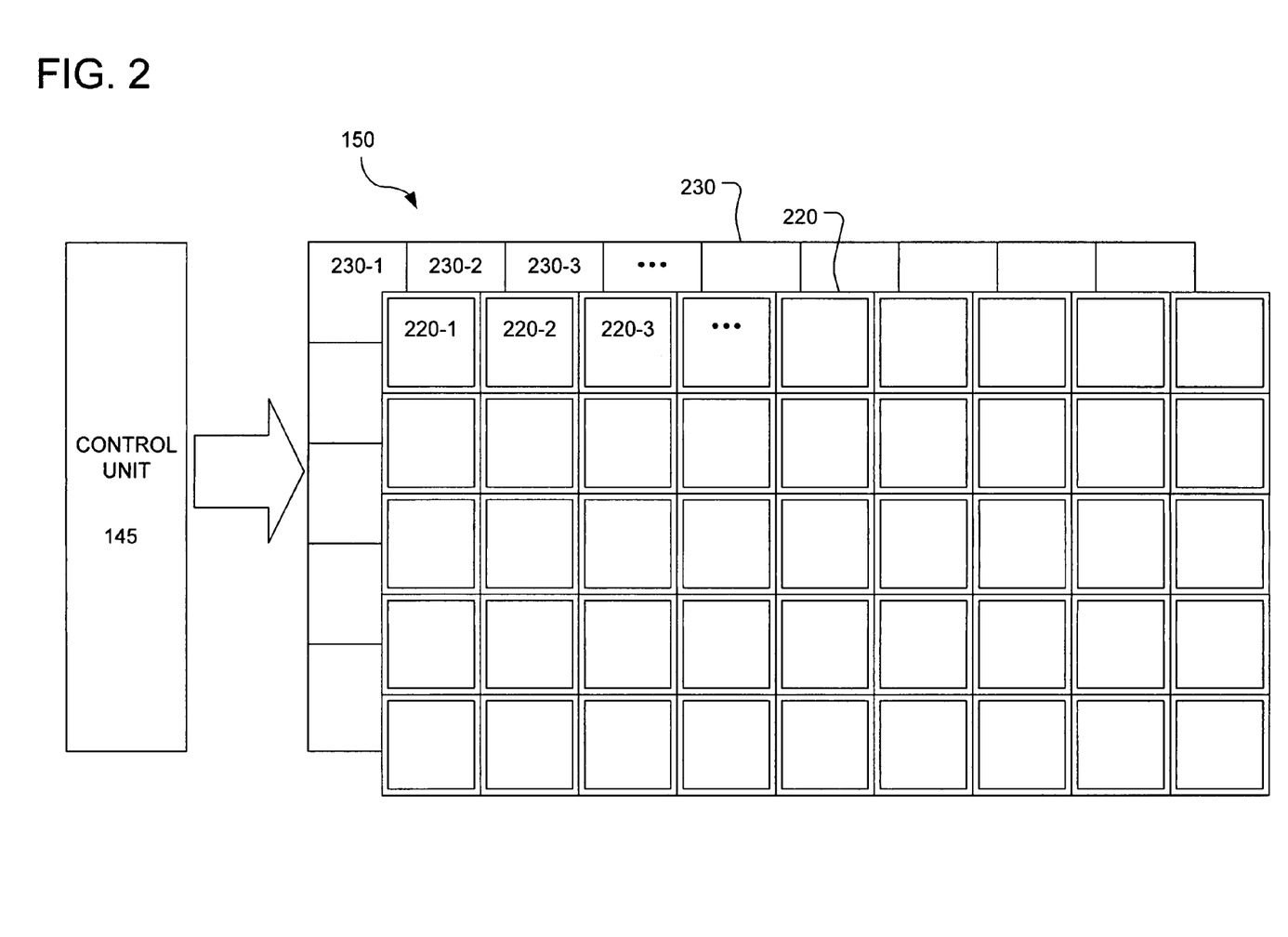
FIG. 2 illustrates light deflectors and corresponding driving units implemented in the display panel, under the control of a control unit, according to an embodiment of the present invention.

FIG. 2 illustrates light deflectors and corresponding driving units implemented in the display panel, under the control of a control unit, according to an embodiment of the present invention. The imaging configuration in FIG. 2 includes an array of precision light deflecting devices 220 and a corresponding array of steering units 230. Each light deflecting device 220 and corresponding steering unit corresponds to a particular pixel position in the display panel 150. As such, each precision light deflecting device 220 is microscopically small. For example, the precision light deflecting device 220 is relatively the size of an image pixel of the display panel 150 or smaller. Also, it is possible for multiple light deflecting devices 220 to correspond to a single pixel position.

According to an exemplary embodiment, the operable state of each light deflecting device 220 is changed through electrical, mechanical, and/or magnetic forces applied by the corresponding steering unit 230. FIG. 2 further illustrates a control unit 145, which controls the steering units 230 (e.g., via control signals) to apply the forces needed for switching the array of light deflecting devices 220 to the necessary operable states. Thus, under the control of the control unit 145, the light deflecting devices 220 selectively aim light, and thus direct images, toward different observing positions.

For example, in FIG. 2, steering units 230-1, 230-2, and 230-3 selectively switch the operable states of light deflecting devices 220-1, 220-2, and 220-3, and so on, to establish the particular direction in which an image is displayed by the display panel 150. Thus, each light deflecting unit 220-n (n being an arbitrary position in the array) may include one or more optical components for deflecting light in a certain direction, while the corresponding steering unit 230-n includes the necessary electrical and/or mechanical components to adjust the optical component(s) and, thus, switching the light deflecting device 220 to an appropriate operable state. Further, the operation of the electrical, mechanical, and/or magnetic components in each steering unit 230 is driven by control signals from the control unit 145.

In this way, the control unit 145 selectively controls the array of light deflecting devices 220 to be in different operable states for deflecting light (e.g., backlight) in different programmable directions. This allows the display panel 150 to aim images toward different observing positions.

For example, to create a 3D effect for a particular image frame, the control unit 145 may cause a particular set of light deflecting devices 220 to sequentially switch to a first operable state, corresponding to a viewer's right eyeball, and then to a second operable state, corresponding to the viewer's left eyeball. The light signals, e.g., from the display panel's 150 backlight sources, may be controlled according to different image signals when the light deflecting devices 220 are in the first and second operable states, respectively. Thus, during each image frame, a timesharing scheme may be implemented whereby each light deflector transmits a first image $I_R$ to the viewer's right eyeball, and then transmits a second image $I_L$ to the viewer's left eyeball. The images $I_R$ and $I_L$ are slightly different from each other, designed to create a 3D effect for the viewer. Since the switching between first and second operable states occurs rapidly during successive image frames, the images $I_R$ and $I_L$ are transmitted in a substantially simultaneous manner. The viewer's brain is able to combine the received right-eye and left-eye images $I_R$ and $I_L$ to obtain a 3-D image.

Figure 3A:
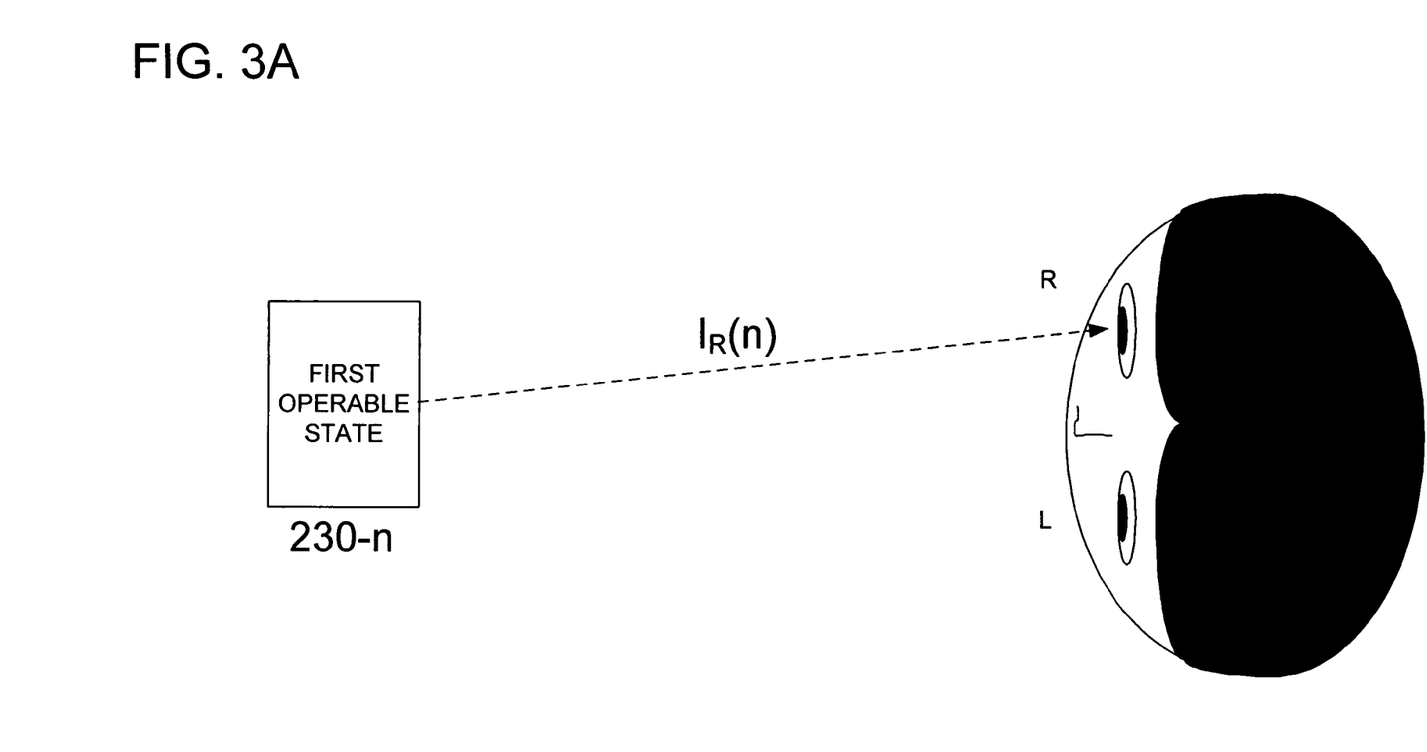
FIGS. 3A and 3B illustrate different operable states of a light deflector for deflecting different images, respectively, to different observing positions, according to an exemplary embodiment of the present invention.
Figure 3B:
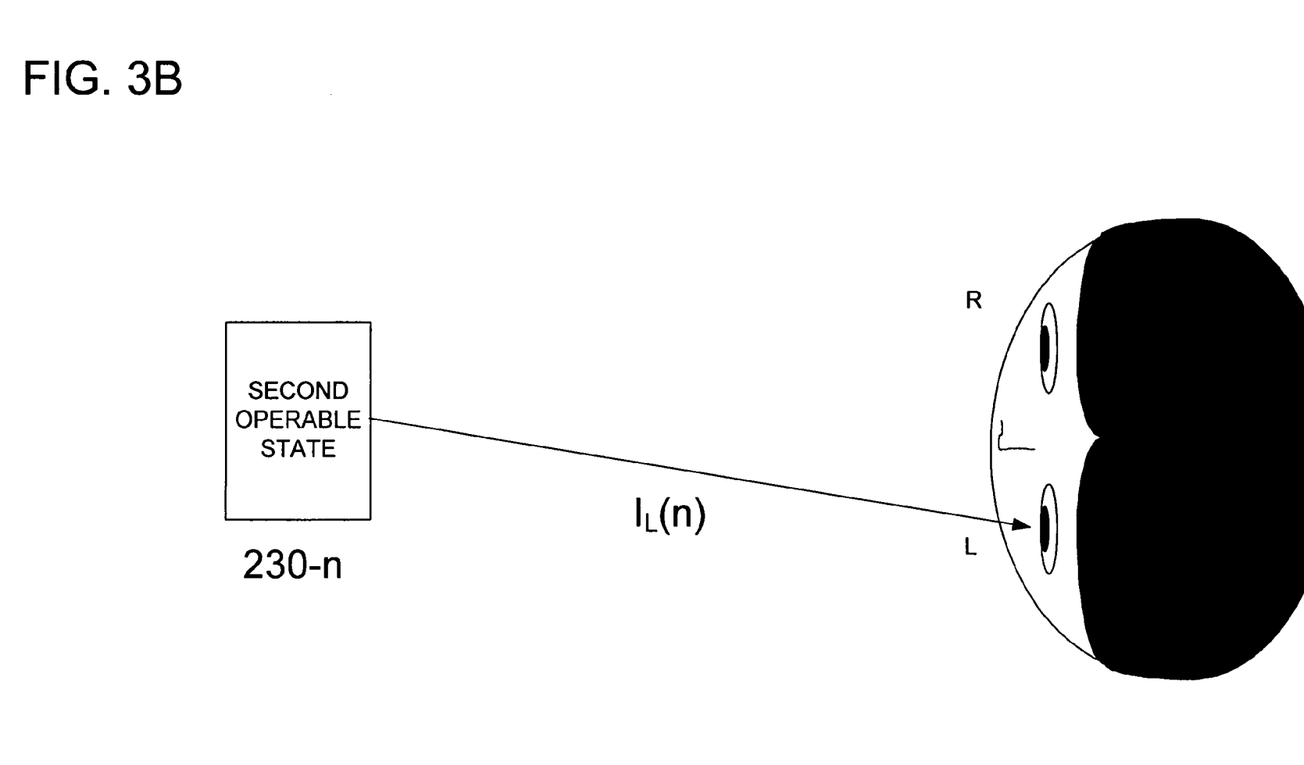

An example of the above operation is shown in FIGS. 3A and 3B. Particularly, these figures illustrate a precision light deflecting device 220-$n$ corresponding to an arbitrary n-th pixel position in the display panel 150. FIG. 3A illustrates that, in the first operable state, the optical component(s) are situated in order to deflect light toward the viewer's right eye situated at position R. During this state, as shown in FIG. 3A, the light being deflected is determined in accordance with an image signal $I_R(n)$, which corresponds to the n-th pixel of the right-eye image $I_R$. FIG. 3B shows the light deflecting device 220-$n$ in the second operable state, such that the optical component(s) deflect light toward the viewer's left eye situated at position L. In FIG. 3B, the light being deflected is determined according to an image signal $I_L(n)$, which corresponds to the n-th pixel of the left-eye image $I_L$.

Referring again to FIGS. 3A and 3B, the positions R and L are known, or have been identified, by the control unit 145. Thus, the control unit 145 is able to program the light deflecting device 220-$n$ to deflect light toward positions R and L when switched to the first and second operable states, respectively, via the operation of the corresponding steering unit 230-$n$.

The above example requires a relative high level of precision for the light deflecting properties of each light deflecting device 220. However, an alternative embodiment of the invention is possible, in which less precision is required. For example, instead of creating a 3D effect for one or more viewers, the display panel 150 may be designed to display different types of information (i.e., different images) to different viewers at substantially the same time. Thus, the different operable states of each light deflecting device 220 may correspond to the positions of different viewers (e.g., positions 171, 172, and 173 in FIG. 1). Thus, in a particular operable state, each light deflecting device 220 may be designed so that the deflected light is dispersed to both eyeballs of a particular viewer, such that the displayed images are standard two-dimensional (2D) images.

Furthermore, it is possible to extend one of the above embodiments by designing the light deflecting devices to have more than two operable states. For instance, when there are multiple viewers, the light deflecting devices 220 may have a distinct operable state for each eyeball of each viewer. Thus, referring again to FIG. 1, the first and second operable states of a light deflecting device 220 may correspond to the eyeball positions R1 and L1 of one viewer, while the third and fourth operable states of the same light deflecting device correspond to the eyeball positions R2 and L2 of another viewer, and so on. Further, the light deflecting devices 220 may be designed to sequentially switch between these operable states according to a timesharing scheme, which allows the 3D image to be displayed to the multiple viewers in a substantially simultaneous manner. For example, when there are two viewers present, the light deflecting devices 220 may be successively aimed toward the first viewer's right eye R1 during the first ¼ of the frame period, toward the first viewer's left eye L1 during the second ¼ of the frame period, toward the second viewer's right eye R2 during the third ¼ of the frame period, and toward the second viewer's left eye L2 during the fourth ¼ of the frame period. By rapidly cycling through the frame periods, both viewers may see the same 3D images at substantially the same time.

However, another alternative embodiment is possible for displaying 3D images to multiple viewers, which will be described in more detail below in connection with FIG. 4 et seq. Particularly, multiple light deflecting devices 220 may be assigned to each pixel position, each light deflecting device 220 being programmed for a different viewer position. Thus, even though each particular light deflecting device only switches between two different operable positions, 3D image can simultaneously displayed by display panel 150 to multiple viewers.

Figure 4:
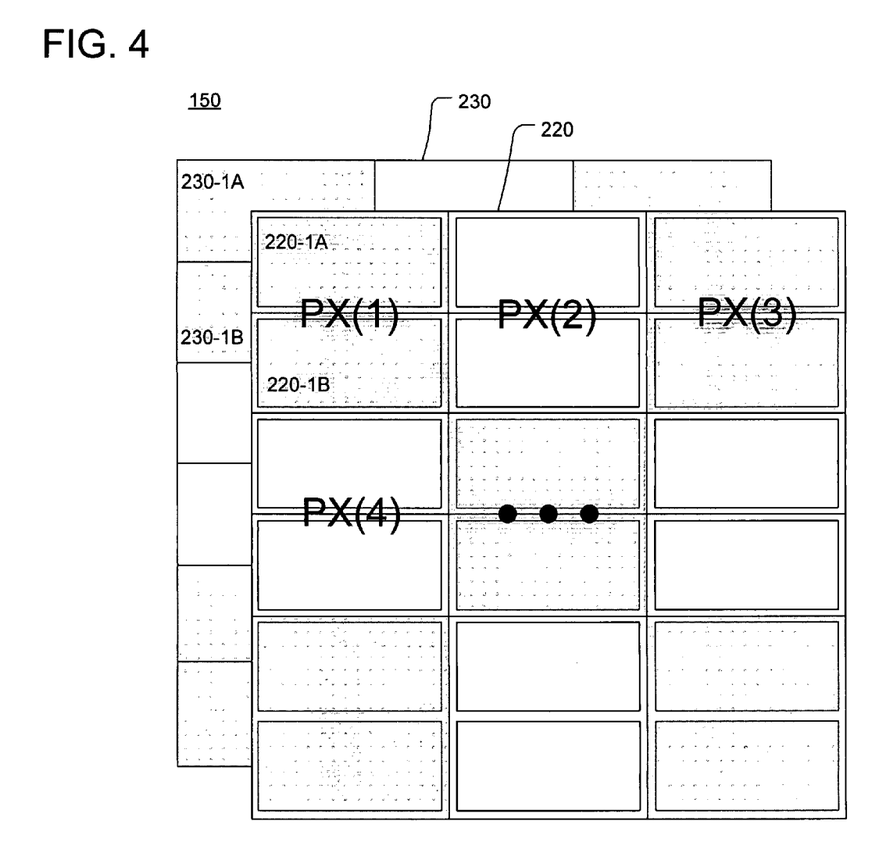
FIG. 4 illustrates a configuration of the display panel where multiple light deflectors correspond to each pixel position, according to an exemplary embodiment of the present invention.

FIG. 4 illustrates a configuration of the display panel where multiple light deflectors 220 correspond to each pixel position. Particularly, the example of FIG. 4 shows two light deflecting devices 220-$n$A and 220-$n$B for an arbitrary n-th pixel position. I.e., FIG. 4 shows two light deflecting devices 220-1A and 220-1B (with the two corresponding steering units 230-1A and 230-2B) assigned to the first pixel position PX(1).

Figure 5A:
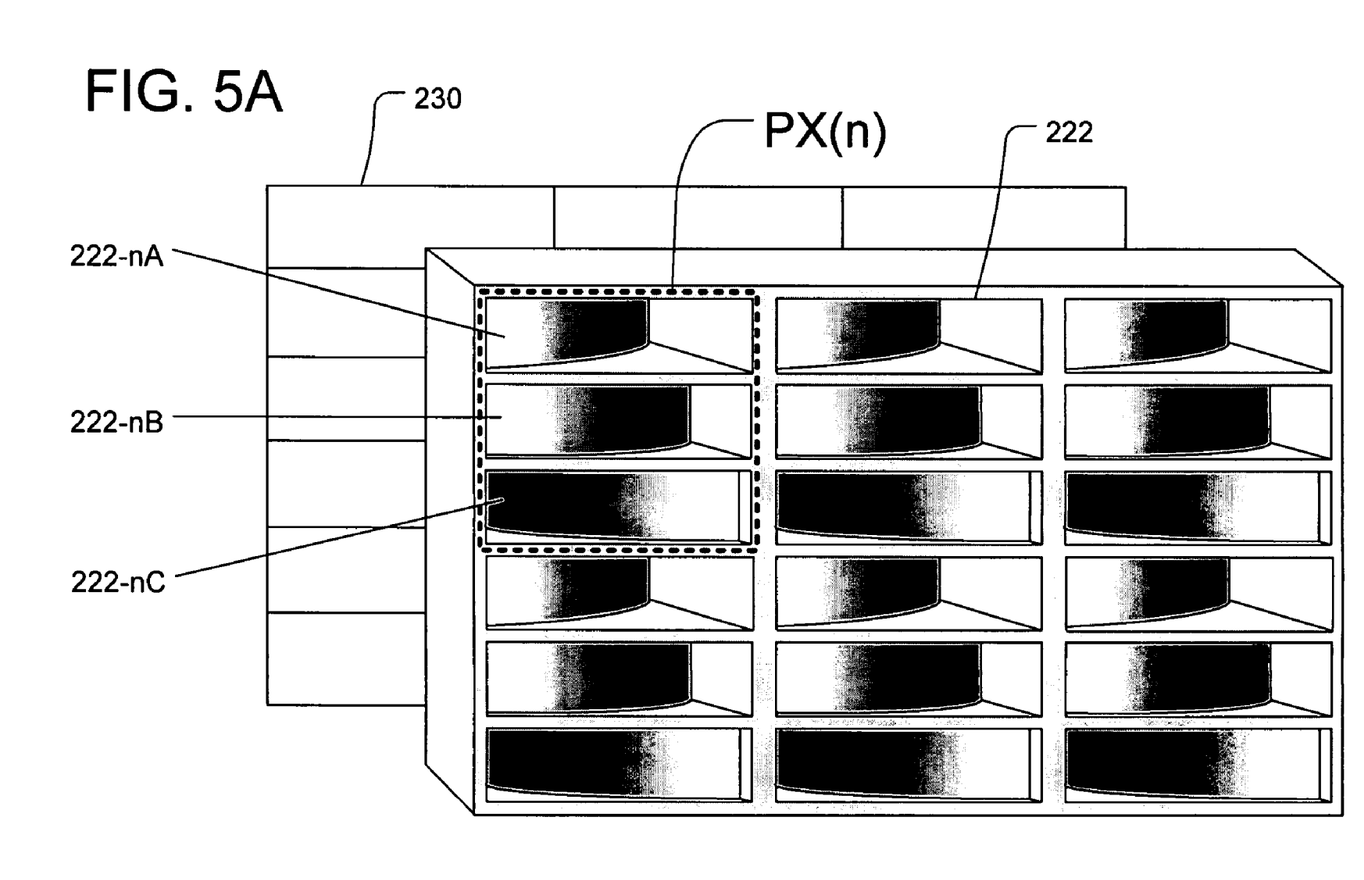
FIGS. 5A-5C illustrates a specific embodiment incorporating microfluidic devices as light deflectors in the display panel, according to an exemplary embodiment of the present invention.
Figure 5B:
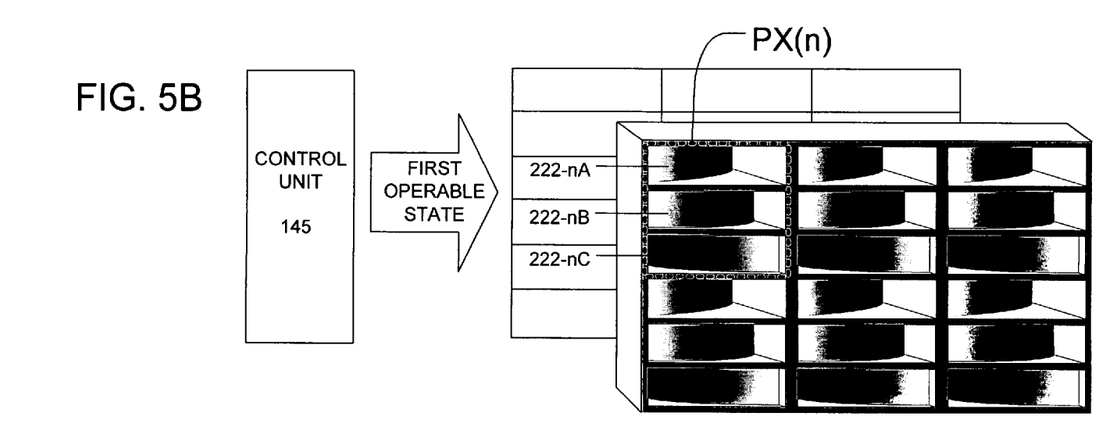
Figure 5C:
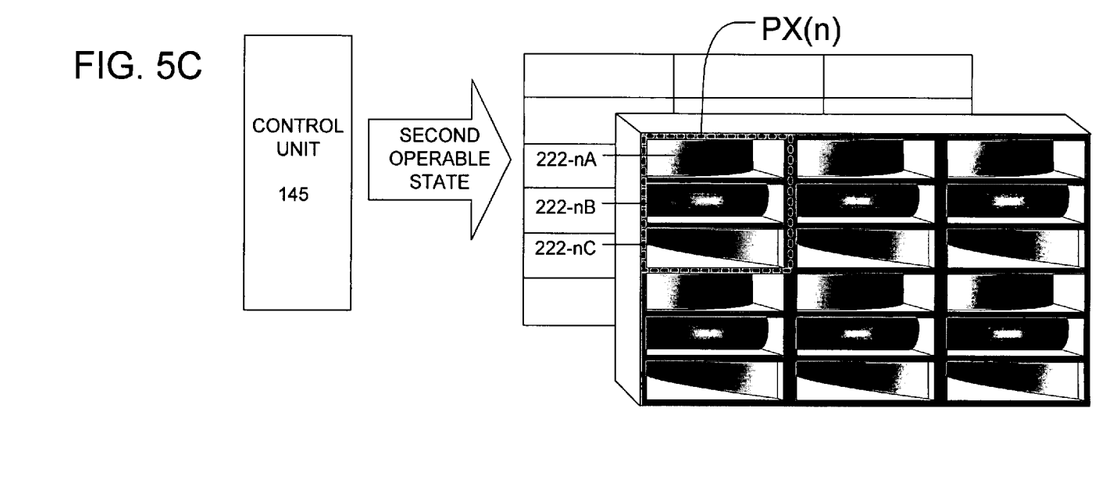

As discussed above, according to an exemplary embodiment, the array of light deflecting devices 220 may be composed of an array of microfluidic devices, as described in U.S. patent application Ser. Nos. 11/546,441 and 11/546,442, entitled "Microfluidic Prism" and "Microfluidic Imaging Array," respectively, both filed Oct. 12, 2006, the entire contents of both of which are herein incorporated by reference. FIGS. 5A-5C illustrates a specific example in which microfluidic devices 222 are implemented as light deflectors 220 in the display panel 150.

A microfluidic device 222 generally includes two immiscible fluids in a reservoir, such that a surface is formed at the interface. Based on the selection of the fluids (or the insertion of an object therebetween), the interface surface possesses certain reflective or refractive qualities that allow incoming light to be deflected in a certain way, e.g., according to Snell's Law. Thus, by controlling the position of the interface surface (e.g., tilt angle), each microfluidic device 222 may be controlled to deflect light in a particular position.

For purposes of illustration only, FIGS. 5A-5C shows one of the fluids as being relatively dark and the other fluid as being optically clear or transparent. As such, the respective interface surfaces are more clearly illustrated. Also, based on properties of the fluids, there may be a small amount of curvature at the interface between the fluids. However, it may be possible to insert a flat object between the fluids, in order to flatten the interface surface and improve the deflecting qualities. In fact, this flat object may be designed to incorporate the necessary reflective/refractive qualities.

FIGS. 5A-5C illustrate a particular exemplary embodiment where each pixel position PX has three microfluidic devices 222. E.g., for an arbitrary pixel position PX(n), each of the corresponding microfluidic devices 222-nA, 222-nB, and 222-nC may correspond to a different viewer position. Accordingly, as shown in FIGS. 5B and 5C, the microfluidic devices 222-nA, 222-nB, and 222-nC of arbitrary pixel position PX(n) may be switched, in synchronization, between first and second operable states, e.g., corresponding to the right and left eyeballs of the respective viewers. Thus, the configuration of FIGS. 5A-5C may be used for simultaneously displaying a 3D image to three different viewers.

Figure 6A:
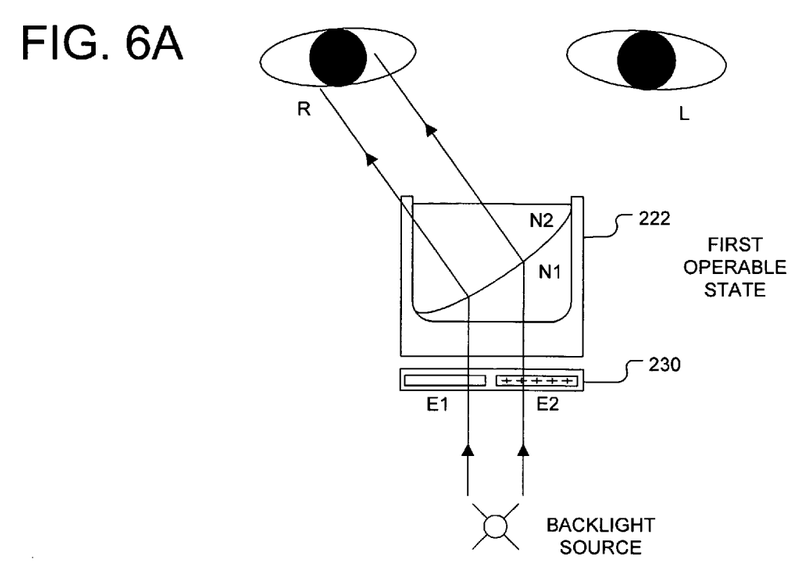
FIGS. 6A and 6B illustrates the operation of a microfluidic device as a light deflector, according to an exemplary embodiment of the present invention.
Figure 6B:
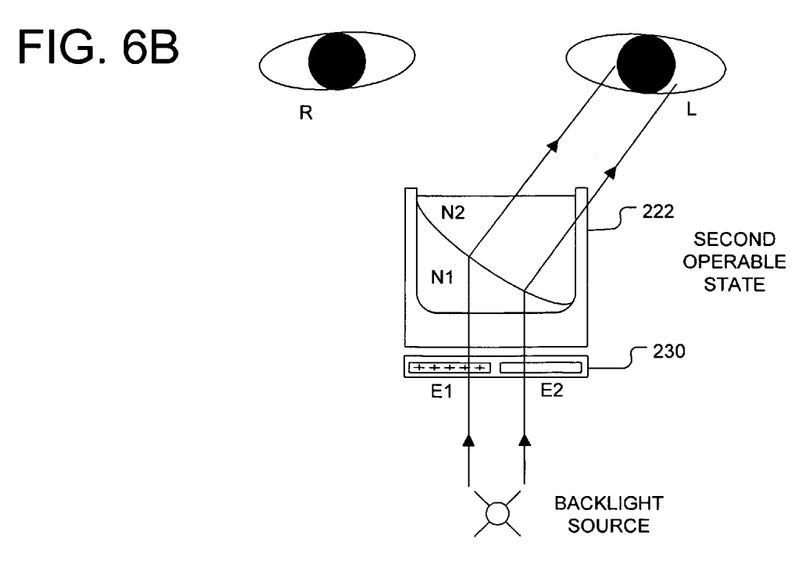

FIGS. 6A and 6B conceptually illustrate the operation of a microfluidic device 222 as a precision light deflector, according to an exemplary embodiment of the present invention. As will be readily apparent, the features (sizes, relative distances, etc.) illustrated in these FIGS. 6A and 6B have been greatly exaggerated for description purposes.

As shown in FIGS. 6A and 6B, the steering unit 230 may comprise multiple steering electrodes. Particularly, these figures illustrate the use of two optically transparent steering electrodes E1 and E2, which control the position of the fluids N1 and N2 (or a flat object inserted therebetween) via an electrokinetic force. For example, depending on the properties of fluid N1 and/or N2, the steering electrodes E1 and E2 may cause the interface surface to move via, e.g., electrophoresis. Alternatively, either dielectrophoresis or electrowetting may be used for controlling the interface surface, depending on the number and/or positioning of steering electrodes in the steering unit 230. Another alternative would be for the steering unit 230 to apply magnetic forces, if either of the fluids N1 or N2 has magnetic properties.

Referring again to FIGS. 6A and 6B, in each microfluidic device 222, light is directed at an angle depending on the position of the interface surface between the two fluids N1 and N2. For example, FIG. 6A shows the microfluidic device 222 in a first operable state, during which incoming light (e.g., backlight) is directed (i.e., by refraction) to the right eye of a viewer. As shown in FIG. 6B, while in the second operable state, the microfluidic device 222 directs incoming light (by refraction) to the left eye of the viewer. To facilitate this operation, the microfluidic device 222 may have an optically transparent reservoir holding the fluids N1 and N2.

The particular example of using two steering electrodes E1 and E2, as shown in FIGS. 6A and 6B, limits the number of potential operable states for the microfluidic device 222. However, it will be readily apparent to those of ordinary skill in the art that the number of steering electrodes may be increased, in order to increase the number of possible tilting positions of the interface surface and, thus, the number of potential operable states. In fact, based on the number and/or configuration of steering electrodes in the steering unit 230, two-dimensional tilting of the interface surface (e.g., in both the horizontal and vertical directions) may be implemented. Thus, the microfluidic device 222 may be designed to switch between different operable states, which allow both the horizontal and vertical direction of the deflected light to be changed.

Referring again to FIGS. 6A and 6B, it is shown that the selective application of voltage to the steering electrodes E1 and E2 switches the microfluidic device 222 between different operable states. Thus, the control unit 145 may be designed to apply these voltages to the steering electrodes, in order to control the operation of the microfluidic device 222.

As illustrated in FIGS. 6A and 6B, the microfluidic device may be designed to deflect a backlight in the display panel 150 via refraction. Examples of backlight sources include one or more light-emitting diodes (LEDs), a cold cathode fluorescent lamp, an illuminated spinning color wheel, etc.

In addition to the optical components in the microfluidic device 222, the display panel 150 may include other optical components (projection lenses, filters, etc.), not shown in FIGS. 6A and 6B, to adjust the light transmitting from microfluidic device 222. Also, the number and placement of steering electrodes in the steering unit 230 may be modified from that shown in FIGS. 6A and 6B.

Further details about morphology and operation of the microfluidic device 222 are described in U.S. patent application Ser. Nos. 11/546,441 and 11/546,442, entitled "Microfluidic Prism" and "Microfluidic Imaging Array," respectively, both filed Oct. 12, 2006, the entire contents of both of which are herein incorporated by reference. As indicated above, the configurations of the microfluidic device 222 and steering unit 230 illustrated in FIGS. 6A and 6B is an exemplary configuration, and other configurations are possible.

For example, while FIGS. 6A and 6B shows a configuration in which the interface surface in microfluidic device 222 deflects backlight by refraction, it is also possible for the microfluidic device 222 to direct light to the appropriate observing positions by reflection. This may be accomplished by designing the interface surface to be reflective, based on the optical properties of the fluid N1 or N2, or by placing a reflective element between the fluids N1 and N2. Accordingly, the microfluidic device 222 might operate similar to a micromirror device, such as the Digital Micromirror Device™ (DMD) from Texas Instruments. Such operation is described in more detail below in connection with FIGS. 8A and 8B.

Figure 7:
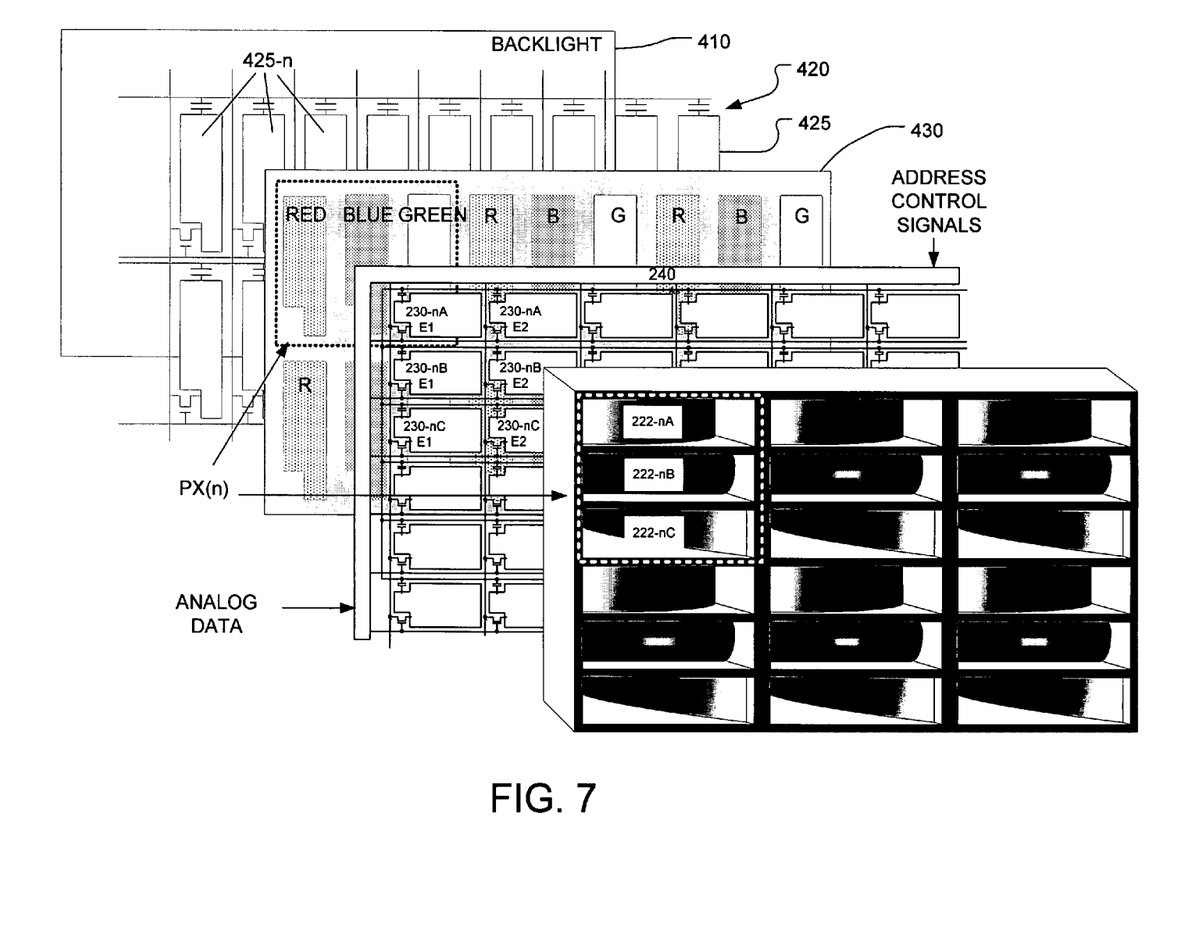
FIG. 7 is a schematic diagram providing a more detailed illustration of an embodiment utilizing microfluidic devices in the display panel, according to an exemplary embodiment of the present invention.

FIG. 7 is a schematic diagram providing a more detailed illustration of an embodiment utilizing microfluidic devices 222 in the display panel 150, according to an exemplary embodiment of the present invention.

As illustrated in FIG. 7, the display panel 150 includes a backlight system 410; a liquid crystal (LC) layer 420 comprised of multiple liquid crystal cells 425; a color filter system 430; an array of microfluidic devices 222 and a corresponding array of steering units 230. The backlight system 410 provides illumination for the display panel 150. The backlight system 410 may include LEDs, cold cathode fluorescent lamps, etc. The backlight system 410 may be a backlight system associated with a liquid crystal device (LCD), a large panel display, an advertisement display, etc.

In FIG. 7, the LC layer 420 includes a plurality of LC cells 425, and electrical circuitry for driving the LC cells 425. Specifically, each LC cell 425 is driven by the corresponding circuitry to control the passage backlight toward the color filter 430. For example, if a particular pixel position PX is to display black, the LC cells 425 corresponding to red, green, and blue would be controlled to block backlight from passing. Conversely, if the pixel position PX is to display a high intensity of red, the corresponding LC cell 425 would be driven to allow full or almost full passage of backlight. It will be readily apparent to those of ordinary skill in the art how to implement the LC layer 420. For instance, in one exemplary embodiment, the LC layer 420 may be compatible with thin-film transistor (TFT) technology that is commonly implemented in the manufacture of liquid crystal display (LCD) panels.

The color filter system 430 of FIG. 7 includes red, blue, and green color filters for each pixel. The intensities of red, green, and blue in each pixel, as determined according to the amount of backlight allowed to pass through the corresponding LC cells 425, may be mixed to generate a particular pixel color from a full spectrum of colors, according to well-known methods in the art.

FIG. 7 further illustrates an array of steering units 230 for controlling a corresponding array of microfluidic devices 222, according to principles described above. FIG. 7 also shows decoding circuitry 240 interfacing the steering units 230 to the control unit 140. For instance, the decoding circuitry 240 may be designed to decode control signals from the control unit 140 to determine the address or location of the particular microfluidic device 222 being controlled. The decoding circuitry 240 may also be designed to decode analog data to determine the amount of tilt (i.e., the position) for the interface surface of the particular microfluidic device 222.

According to the particular example of FIG. 7, there are three microfluidic devices 222-nA, 222-nB, 222-nC for each arbitrary pixel position PX(n) of the display panel. Each microfluidic device 222-nA, 222-nB, 222-nC may correspond to a particular viewer; thus, the configuration of FIG. 7 is particularly designed for three viewers.

Thus, the configuration of FIG. 7 may be used for displaying 3D images to the viewers illustrated in FIG. 1. For example, during successive image frames, the collection of steering units 230-nA may be designed to repeatedly switch the corresponding microfluidic devices 222-nA between first and second operable states, according to the principles described above, in order to display a 3D image to the viewer at position 171. Similarly, the collection steering units 230-nB may be designed to switch the corresponding microfluidic device 222-nB to repeatedly switch between first and second operable states to display a 3D image to the viewer at position 172. Likewise, steering units 230-nC may be designed to repeatedly switch the corresponding microfluidic devices 222-nC between first and second operable states.

During each of the image frames, the LC layer 420 controls the passage of light from backlight system 410 according to image signals, e.g., received from control unit 145 (or another control unit). Particularly, while the microfluidic devices 222-nA, 222-nB, and 222-nC are in the first operable state, the corresponding LC cells 425-n may operate according to an image signal $I_R(n)$ corresponding to the right eyeball image $I_R$. Consequently, when the microfluidic devices 222-nA, 222-nB, and 222-nC are in the second operable state, the corresponding LC cells 425-n may operate according to an image signal $I_L(n)$ corresponding to the left eyeball image $I_L$.

Embodiments have been described above in which the light deflecting devices 220 are comprised of microfluidic devices 222. However, other types of light deflecting devices 220 may be used in the present invention.

According to an alternative embodiment, the light deflecting devices 220 in the display panel 150 may comprise an array of microscopically small, mechanical micromirror devices, such as the Digital Micromirror Device™ (DMD) from Texas Instruments. Various aspects of DMD technology is described in "Why is the Texas Instruments Digital Micromirror Device™ So Reliable," Michael R. Douglass and Ian S. McMurray, available at: <http://www.dlp.com/dlp_technology/images/dynamic/white_papers/135_Myth.pdf> (last accessed Nov. 10, 2006), the entire contents of which are herein incorporated by reference.

Figure 8A:
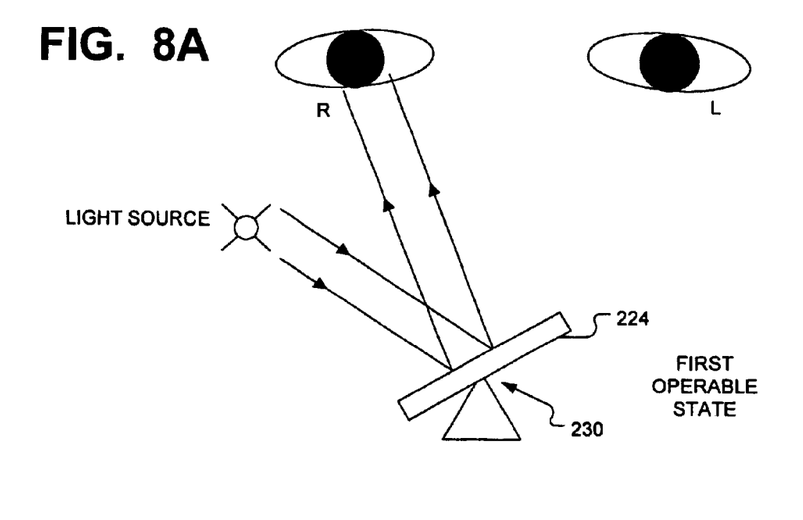
FIGS. 8A and 8B illustrate the operation of a mechanical micromirror device as a light deflector, according to an exemplary embodiment of the present invention.
Figure 8B:
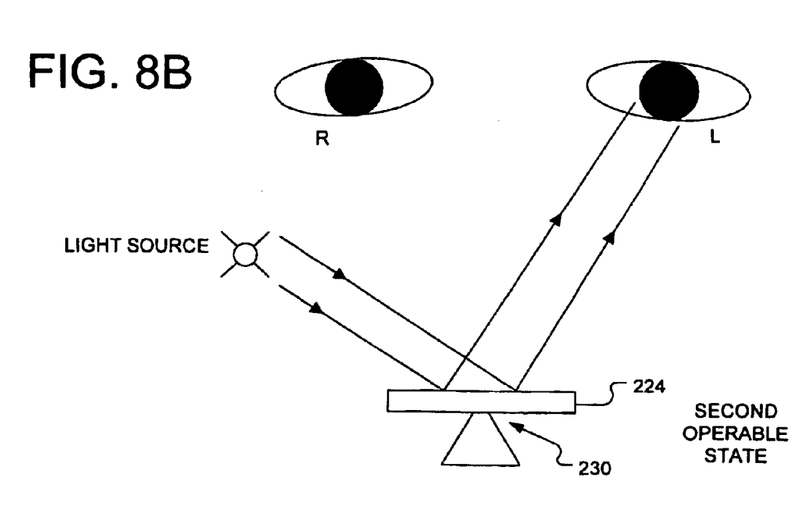

FIGS. 8A and 8B conceptually illustrate the operation of a mechanical micromirror device as a light deflecting device 220, according to an exemplary embodiment of the present invention. For purposes of description, the features (sizes, distances, etc.) illustrated in these figures have been greatly exaggerated.

As shown in FIGS. 8A and 8B, a micromirror device 224 is designed to reflect the light source to a particular observing position based on the operable state. Accordingly, in the first operable state (FIG. 8A), the micromirror device 224 may be positioned to reflect light from a light source directly to the viewer's right eye at position R. In the second operable state, the micromirror device 224 may be positioned to reflect light from the source to the viewer's left eye at position L. In this embodiment, the corresponding steering unit 230 may comprise mechanical components at the hinge, designed to control the tilt of the mirror.

Also, in FIGS. 8A and 8B, other optical components (not shown) may be inserted in the light path between the micromirror device 224 and the viewer's eyes, as will be contemplated by those of ordinary skill in the art.

It should be noted that micromirror devices 224 according to DMD technology are generally designed for two operable states or positions. However, there is nothing in their design that precludes them from being modified for more than two operable states. Thus, when there are multiple viewers present, it would be possible to program each mechanical micromirror device 224 with a distinct operable state for each eyeball of each viewer.

Referring back to FIG. 1, the directional display device 100 is designed to display images directly to various observing positions. In higher precision applications, such as a 3D display, the observing positions correspond to the various eyeball positions R1, L1, R2, L2, R3, L3. Accordingly, the control unit 145 may need to identify these observing positions in order to control the precision light deflecting devices 220 to aim the images toward these positions.

According to one exemplary embodiment, the observing positions may be predetermined, e.g., each viewer may need to be situated at a designated area (e.g., a seat at a fixed position).

According to an alternative embodiment, the directional display device 100 may be designed to periodically search for the positions of viewers' eyes. Such positional information may be sent to the control unit 145. The directional display device 100 may reconfirm the positions of the viewers' left and right eyes during each image frame period, or at less frequent periods.

For example, to search and identify locations for viewers' eyes, the directional display device 100 may incorporate elements and techniques described in U.S. patent application Ser. No. 11/586,698, entitled "LCD Based Environment Scanner and 3-D Display," filed on Oct. 26, 2006, the entire contents of which are herein incorporated by reference. As described in this application, a liquid crystal display (LCD) panel may incorporate cylindrical or spherical lens arrays, allowing viewing environment to be scanned with beams of parallel or convergent rays. Based on these scanned beams, targets corresponding to viewers' eyeball positions may be detected.

However, other techniques may also be used to search and identify locations for viewers' eyes. For example, one or more cameras may be used to track viewers. The perspectives of the images generated by the cameras are then mathematically transformed to reflect the positions of the viewers with respect to the directional display panel 150.

With various exemplary embodiments being described above, it should be noted that such descriptions are provided for illustration only and, thus, are not meant to limit the present invention defined by the claims below. The present invention is intended to cover any variation or modification of these embodiments, which do not depart from the spirit or scope of the present invention.

I claim:

1. An image display device, comprising:
   a display panel configured to display a plurality of autostereoscopic image pairs in such a manner that each autostereoscopic image pair of the plurality is substantially simultaneously aimed in a different programmable direction, wherein at least one autostereoscopic image pair of the plurality conveys subject matter that is different from the subject matter being conveyed by the other autostereoscopic image pairs of the plurality; and a controller configured to identify observing positions proximate to the display panel program the display panel to aim different autostereoscopic image pairs of the plurality toward the identified observing positions, respectively, in a substantially simultaneous manner; and a plurality of light deflectors configured to selectively deflect light toward the observing positions, wherein each autostereoscopic image pair of the plurality is displayed according to a plurality of image signals corresponding to a plurality of pixel positions on the display panel, each light deflector is allocated to a particular pixel position on the display panel, such that the light deflector selectively deflects light in accordance with image signals that correspond to the particular pixel position.

2. The image display device of claim 1, wherein each light deflector has a first operable state for deflecting light towards a first observing position and a second operable state for deflecting light towards a second observing position, and the controller selectively controls each light deflector to be in said first and second operable states.

3. The image display device of claim 2, wherein the controller generates first and second sets of image signals corresponding to a first and a second image of the autostereoscopic image pair, respectively, such that:

while in the first operable state, the light deflectors deflect light according to the first set of image signals, toward the first observing position, and while in the second operable state, the light deflectors deflect light according to the second set of image signals, toward the second observing position.

4. The image display device of claim 3, wherein the controller controls the light deflectors to switch, in synchronization, between the first and second operable states according to a timesharing scheme that allows the first and second images to be viewed at substantially the same time at the first and second observing positions.

5. The image display device of claim 4, wherein the first and second observing positions correspond to left and right eyeball positions, respectively, for a particular viewer.

6. The image display device of claim 5, wherein the controller generates first and second images in order to create a three-dimensional (3D) visual effect for the viewer.

7. The image display device of claim 4, wherein the controller is configured to identify a viewer proximate to the display surface, and program the first and second operable states of the light deflectors based on the viewer's position.

8. The image display device of claim 4, wherein multiple light deflectors are allocated to each pixel position on the display panel, the multiple light deflectors corresponding to multiple viewers.

9. The image display device of claim 8, wherein, for each pixel position, the allocated light deflectors are configured to deflect light to different first observing positions while in the first operable state, and the allocated light deflectors are configured to deflect light to different second observing positions while in the second operable state.

10. The image display device of claim 9, wherein the different first observing positions correspond to the left eyeball positions for the multiple viewers, respectively, and the different second observing positions correspond to the right eyeball positions for the multiple viewers, respectively.

11. The image display device of claim 4, wherein each light deflector also has a third operable state for deflecting light towards a third observing position and a fourth operable state for deflecting light towards a fourth observing position, such that while in the third operable state, the light deflectors deflect light according to the first set of image signals, toward the third observing position, and while in the fourth operable state, the light deflectors deflect light according to the second set of image signals, toward the fourth observing position.

12. The image display device of claim 11, wherein the first and second observing positions correspond to the left and right eyeball positions, respectively, for a first viewer, the third and fourth observing positions correspond to the left and right eyeball positions, respectively, for a second viewer, and the controller controls the light deflectors to switch, in synchronization, between the first, second, third, and fourth operable states according to a timesharing scheme that allows the first and second images to be viewed at substantially the same time by the first and second viewers.

13. The image display device of claim 1, wherein each light deflector is a micro-mirror, which is selectively displaceable into the first and second operable states via mechanical operation.

14. The image display device of claim 2, wherein each light deflector is a microfluidic device including an interface between first and second fluids, the interface being selectively displaceable into the first and second operable states via electrical or magnetic force.

* * * * *